(12) United States Patent
Lichtenberger

(10) Patent No.: US 9,097,435 B2
(45) Date of Patent: Aug. 4, 2015

(54) SOLAR PHOTOVOLTAIC WATER HEATING SYSTEM UTILIZING MICROPROCESSOR CONTROL AND WATER HEATER RETROFIT ADAPTOR

(71) Applicant: Michael Steven Lichtenberger, Los Angeles, CA (US)

(72) Inventor: Michael Steven Lichtenberger, Los Angeles, CA (US)

( * ) Notice: Subject to any disclaimer, the term of this patent is extended or adjusted under 35 U.S.C. 154(b) by 94 days.

(21) Appl. No.: 13/845,818

(22) Filed: Mar. 18, 2013

(65) Prior Publication Data

US 2014/0112647 A1 Apr. 24, 2014

Related U.S. Application Data

(60) Provisional application No. 61/685,479, filed on Mar. 19, 2012.

(51) Int. Cl.
| | |
|---|---|
| *F24H 1/20* | (2006.01) |
| *H05B 3/78* | (2006.01) |
| *F24H 9/18* | (2006.01) |
| *F24H 9/20* | (2006.01) |

(52) U.S. Cl.
CPC ............... *F24H 1/202* (2013.01); *F24H 1/205* (2013.01); *F24H 9/1818* (2013.01); *F24H 9/2021* (2013.01); *F24D 2200/02* (2013.01); *F24D 2220/042* (2013.01); *F24D 2240/26* (2013.01); *Y02B 10/20* (2013.01); *Y02B 10/70* (2013.01)

(58) Field of Classification Search
None
See application file for complete search history.

(56) References Cited

U.S. PATENT DOCUMENTS

| | | | | |
|---|---|---|---|---|
| 1,526,204 | A * | 2/1925 | Campbell | 392/451 |
| 2,459,123 | A * | 1/1949 | Bates et al. | 204/196.15 |
| 4,200,783 | A * | 4/1980 | Ehret | 392/341 |
| 5,168,546 | A * | 12/1992 | Laperriere et al. | 392/454 |
| 5,293,447 | A * | 3/1994 | Fanney et al. | 392/449 |
| 6,837,303 | B2 * | 1/2005 | Butler | 165/74 |
| 7,913,684 | B2 * | 3/2011 | Butler | 126/589 |
| 2008/0107409 | A1 * | 5/2008 | Lesage et al. | 392/454 |
| 2009/0214195 | A1 * | 8/2009 | Thomasson | 392/451 |
| 2012/0060829 | A1 * | 3/2012 | Duplessis et al. | 126/609 |
| 2013/0263843 | A1 * | 10/2013 | Kreutzman | 126/615 |
| 2014/0010522 | A1 * | 1/2014 | van der Heijden et al. | 392/451 |
| 2014/0112647 | A1 * | 4/2014 | Lichtenberger | 392/308 |
| 2014/0153913 | A1 * | 6/2014 | Newman et al. | 392/451 |

OTHER PUBLICATIONS

Discovered product website http://www.usa-eds.com/web/ (could not find corresponding patent, though claimed on website).

* cited by examiner

*Primary Examiner* — Thor Campbell
(74) *Attorney, Agent, or Firm* — Khorsandi Patent Law Group, A Law Corporation; Marilyn R. Khorsandi

(57) ABSTRACT

A solar-powered photovoltaic thermal fluid heating system having an array of photovoltaic modules, an energy conversion control unit, sensors for tank temperature, with resistance heating element/tank flush water heater adaptor installed in a fluid-filled gas or electrically heated thermal storage tank. The advantages of the present invention include, without limitation, include an simple, safe, and efficient method for utilizing solar energy for the heating of water that is protected from the dangers of freezing and/or overheating, and easily retrofittable to new and existing gas and electric hot water storage tanks.

9 Claims, 1 Drawing Sheet

SOLAR PHOTOVOLTAIC WATER HEATING SYSTEM UTILIZING MICROPROCESSOR CONTROL AND WATER HEATER RETROFIT ADAPTOR

CROSS-REFERENCE TO RELATED APPLICATIONS

The present U.S. patent application is a non-provisional patent application of, and that claims, under 35 U.S.C. §119 (e)(1), benefit of, and priority to, U.S. Provisional patent application, Ser. No. 61/685,479, filed Mar. 19, 2012, entitled "Solar Photovoltaic Water Heating System Utilizing Microprocessor Control and Water Heater Retrofit Adaptor," the entire disclosures and content of which are incorporated herein by reference for all purposes as if fully stated herein.

BACKGROUND OF THE INVENTION

1. Field of the Invention

The present invention relates to the field of solar-powered fluid heating systems, and more particularly to a novel solar-powered system having a photovoltaic collector which includes a novel resistance heating element/tank flush water heater adaptor and energy conversion controller which incorporates microprocessor control having improved efficiency and safety features.

2. Brief Description of the Prior Art

In the past, it has been a conventional practice to employ commercially solar-powered water heating systems, which utilizes an array of photovoltaic cells for converting solar energy to a heated fluid, such as water or the like. Problems and difficulties have been encountered with such prior assemblies, such as that shown and described in U.S. Pat. No. 4,873,480. The problems and difficulties stem largely from the fact that many of the prior solar-powered water heating systems are unduly complicated, because the systems require an array of separate or independent resistance heaters to track the optimal power output parameters of a photovoltaic array. Also, such an assembly is susceptible to component breakdown due to the constant switching of inefficient large power relays. The large operational power requirements of this constant switching produces significant operational losses so that the efficiency of the assembly is greatly reduced. Additionally, systems were limited to installation on electric water heater storage tanks.

Therefore, a long-standing need has existed to provide a solar energy system having a solar controller which converts solar radiation into a heated liquid, such as water, by means of a resistance water heating element that provides improved efficiency, safety, and adaptability for all forms of water storage tanks while retaining the ability to flush sediment from tanks as a part of routine maintenance.

PRIOR ART REFERENCE

| | | | |
|---|---|---|---|
| 4,916,382 | April 1990 | Kent | 323/299 |
| 4,873,480 | October 1989 | Lafferty | 323/229 |
| 4,604,567 | August 1996 | Chetty | 323/229 |
| 4,494,180 | January 1985 | Streater et al | 363/37 |
| 4,404,472 | September 1983 | Steigerwald | 307/46 |
| 4,390,940 | June 1983 | Corbefin et al | 363/132 |
| 4,375,662 | March 1983 | Baker | 363/95 |

SUMMARY OF THE INVENTION

Accordingly, the solar energy system incorporating the present invention includes means providing a solar-powered fluid heating system, having a photovoltaic energy collector, microprocessor controlled energy control device, and the resistance heating energy conversion element with tank flush water heater adaptor.

The photovoltaic collector is any commercially available photovoltaic array meeting the parameters for the operation of the energy conversion control unit and electrical resistance heating element housed within the resistance heating element/tank flush water heater adaptor.

Therefore, it is among the primary objects of the present invention to provide a solar powered fluid heating system whereby the components are arranged in a pre-subscribed manner and wherein the heat conducting means includes a straight or bent/curved electric resistance heating element enclosed in a resistance heating element/tank flush water heater adaptor whereby heat conduction occurs within the water heating tank. To achieve efficient heat dissipation and thermal transfer from the electric resistance heating element to the water, the resistance element needs to be as long as possible. In most tanks this is not possible due to an exhaust gas flue running along the axial center of the tank. To overcome this, a novel non-rotating interface is used to allow insertion of a curved electric resistance heating element into the water heaters flush/drain valve tank bung located at the bottom of the tank, while retaining that functionality for draining and flushing of sediment from tank.

Another object of the present invention is to provide a solar powered fluid heating system which includes an energy conversion control unit that incorporates a sensing circuit for the array current and voltage and microprocessor control that constantly adjusts output of transistors to optimize photovoltaic input circuit maximum power point and a constant voltage output for the resistance heating element thereby enhancing efficiency under the changing conditions of solar insolation. This can include single or multiple energy conversion control unit(s) mounted remotely or under each photovoltaic module and utilizing DC and or AC electrical currents.

Still a further object of the present invention is to provide a highly efficient water heating system including a thermal collector for obtaining solar energy by which the fluid can be heated, employing a novel, adaptable heat conducting assembly that can be retrofitted to both gas fired and electric water heaters.

Another object is to provide a fluid heating system enhancing electrical component longevity in the system due to the lowering stresses and deterioration due to constant cycling of electro-mechanical relays conducting DC and or AC current and is protected from freezing due to the absence of a fluid heat transfer loop.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DETAILED DESCRIPTION OF THE INVENTION

Figure 1:
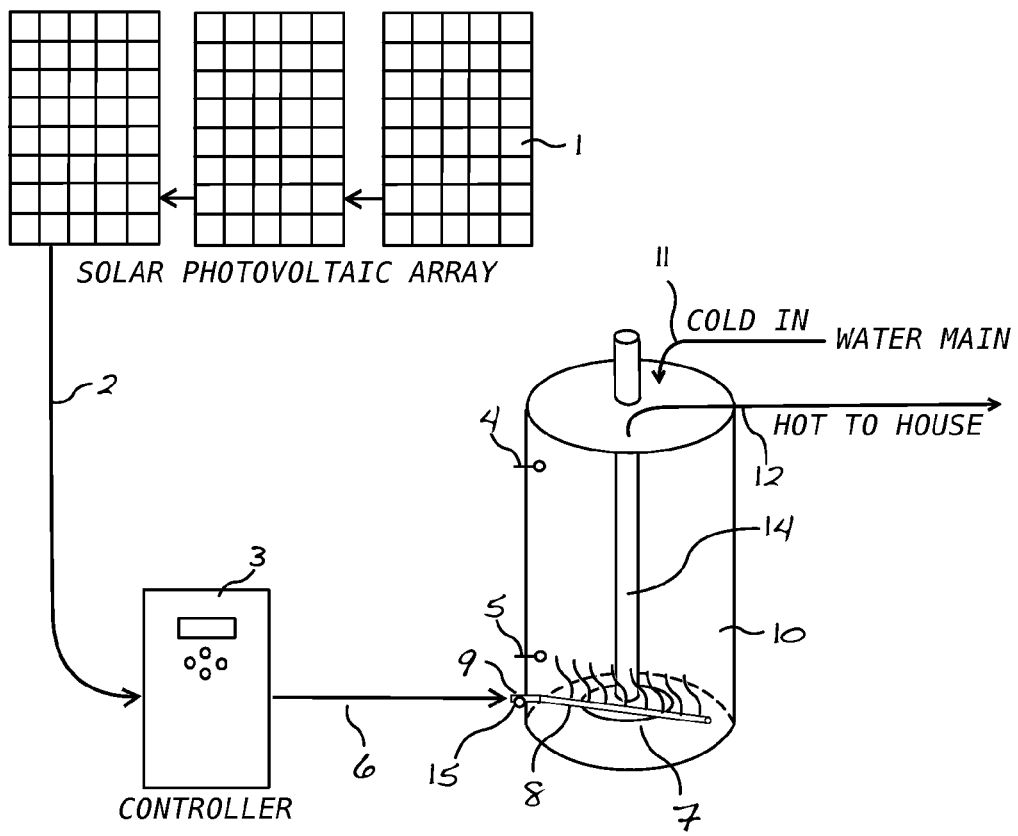
FIG. 1 is a diagrammatic illustration of a photovoltaic fluid heating system employing the solar collector, controller, and energy conduction means incorporating the present invention.

Referring now to the invention in more detail, in FIG. 1, there is shown the photovoltaic thermal fluid heating system having an array of photovoltaic modules 1, a means of conveying the electrical energy 2, to an energy conversion control unit 3, sensors for tank temperature 4 and 5, a means of conveying the modulated electrical energy 6 to unitary assembly comprised of; tank flush water heater adaptor 9, resistance heating element 8, and tank drain/flush valve 15, installed in a fluid-filled, gas or electric heated thermal storage tank 10, into which, a supply of cold water is introduced 11 and heated by resistance element 8. The heated water is then introduced to a dwelling via conduit 12.

In more detail, still referring to the invention of FIG. 1 there is shown the photovoltaic thermal fluid heating system having an array of photovoltaic modules 1, that produce electric current that flows to an energy conversion control unit 3, which monitors the tank 10 temperatures from sensors 4 and 5 at the top and bottom of the tank and controls the electrical energy to a specific voltage and current utilizing a microprocessor controlled Pulse Width Modulator (PWM) and or inverter, and outputs that energy to the unitary resistance heating element/tank flush water heater non-rotating adaptor 9 and to resistance heating element 8, which converts the electrical current flow to thermal energy which is then absorbed by the fluid of the tank. If specific temperature criteria are encountered by the energy conversion control unit 3, (temperature too high) energy transfer to the element 8 is modulated or disconnected. The heated water is then introduced to a dwelling via conduit 12 and a fresh supply of cold water is introduced via conduit 11. The water in the tank is heated by resistance element 8 or through alternate means such as the existing gas burner 7 or electric elements of the water heater 10.

In further detail, still referring to the invention of FIG. 1, the construction details of the invention as shown in FIG. 1 are that all components are compatible with extended contact with heated water and typical materials used in plumbing and hot water heater tank construction. This includes no/low lead brass, stainless steel, bronze, and copper.

Figure 2:
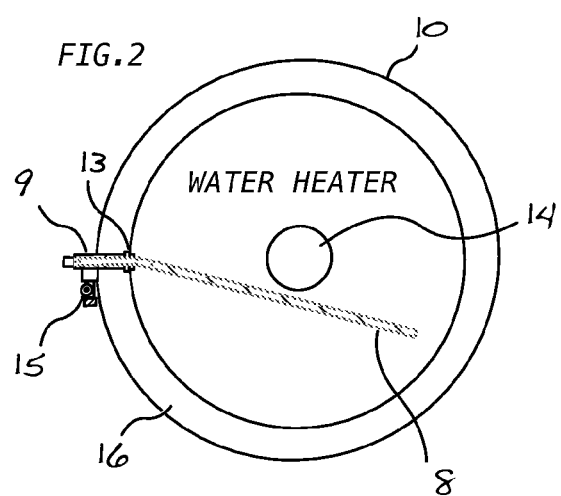
FIG. 2 an overhead view of the water heater showing the novel non-rotating resistance heating element/tank flush water heater adaptor assembly shown in FIG. 1.

Referring now to the invention shown in FIG. 2, the assembly of components is illustrated wherein it can be seen that the solar heat transfer components are contained within the resistance heating element/tank flush water heater adaptor 9 and installed in the water heater drain valve tank bung 13. The bend in the resistance heating element 8, can clearly be seen to allow clearance for the water heater exhaust flue 14. The resistance heating element/tank flush water heater adaptor incorporates a drain valve 15 to retain the functionality for draining and flushing of sediment from the tank 10.

In further detail, still referring to the invention of FIG. 2, the length of the resistance heating element/tank flush water heater adaptor 9, is sized to provide clearance for the insulation 16 surrounding the tank 10 and move the tank drain/flush valve 15 to a location that can be accessed while allowing passage of the resistance heating element 8. The heating element 8 is attached to the resistance heating element/tank flush water heater adaptor 9 by use of a non-rotating flange and captive nut that allows the waterproof attachment, without requiring rotation, of the resistance heating element 8, preventing interference with water heater exhaust gas flue 14.

The advantages of the present invention include, without limitation, a simple, safe, and efficient method for utilizing solar energy for the heating of water that is protected from the dangers of freezing and/or overheating, and easily retrofittable to new and existing gas and electric hot water storage tanks.

In broad embodiment, the present invention is a solar water heating system with multiple applications.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed:

1. A solar energy conversion apparatus, said solar energy conversion apparatus comprising:
    an energy conversion control unit, said energy conversion control unit comprising:
        a sensing circuit for sensing current and voltage output by an array of one or more photovoltaic energy collectors, and
        a microprocessor that transfers a constant voltage output to an electrically-powered tubular resistance heating element;
    a threaded tubular structure comprising threading that threads into a water heater drain valve bung located at a bottom area of a water heater that comprises a separate water heater heating element powered by gas or by electricity, said threaded tubular structure comprising a first end and a second end, said first end exposed through an exterior of said water heater and said second end exposed to an interior of said water heater; and
    said electrically-powered tubular resistance heating element mounted into and passing through said threaded tubular structure, said electrically-powered tubular resistance heating element extending from said first end of said threaded tubular structure through said second end of said threaded tubular structure, and extending beyond said second end, said electrically-powered tubular resistance heating element comprising a connection with said energy conversion control unit for receiving said constant voltage transferred by said energy conversion control unit, said electrically-powered tubular resistance heating element further comprising a length and a bend in said length, said bend occurring in a portion of said length that extends beyond said second end of said threaded tubular structure.

2. The solar energy conversion apparatus of claim 1, said solar energy control unit further comprising:
    a Pulse Width Modulator that outputs energy to said electrically-powered tubular resistance heating element.

3. The solar energy conversion apparatus of claim 1, said energy conversion control unit modulating energy transfer to said electrically-powered tubular resistance heating element.

4. The solar energy conversion apparatus of claim 1, said bend in said length of said electrically-powered tubular resistance heating element averting interference by said electrically-powered tubular resistance heating element with a water heater exhaust flue of said water heater.

5. The solar energy conversion apparatus of claim 1, said threaded tubular structure further comprising a drain valve that drains and flushes sediment from said water heater.

6. A solar energy conversion apparatus, said solar energy conversion apparatus comprising:
- an energy conversion control unit, said energy conversion control unit comprising:
  - a sensing circuit for sensing current and voltage output by an array of one or more photovoltaic energy collectors, and
  - a microprocessor that transfers a constant voltage output to an electrically-powered tubular resistance heating element;
- a threaded tubular structure comprising threading that threads into a water heater drain valve bung located at a bottom area of a water heater that comprises a separate water heater heating element powered by gas or by electricity, said threaded tubular structure comprising a first end and a second end, said first end exposed through an exterior of said water heater and said second end exposed to an interior of said water heater; and
- said electrically-powered tubular resistance heating element mounted into and passing through said threaded tubular structure, said electrically-powered tubular resistance heating element extending from said first end of said threaded tubular structure through said second end of said threaded tubular structure, and extending beyond said second end, said electrically-powered tubular resistance heating element comprising a connection with said energy conversion control unit for receiving said constant voltage transferred by said energy conversion control unit, said electrically-powered tubular resistance heating element further comprising a length and a bend in said length, said bend occurring in a portion of said length that extends beyond said second end of said threaded tubular structure, said threaded tubular structure further comprising a drain valve that drains and flushes sediment from said water heater.

7. The solar energy conversion apparatus of claim 6, said bend in said length of said electrically-powered tubular resistance heating element averting interference by said electrically-powered tubular resistance heating element with a water heater exhaust flue of said water heater.

8. A solar energy conversion apparatus, said solar energy conversion apparatus comprising:
- a threaded tubular structure comprising threading that threads into a water heater drain valve bung located at a bottom area of a water heater that comprises a separate water heater heating element powered by gas or by electricity, said threaded tubular structure comprising a first end and a second end, said first end exposed through an exterior of said water heater and said second end exposed to an interior of said water heater; and
- an electrically-powered tubular resistance heating element mounted into and passing through said threaded tubular structure, said electrically-powered tubular resistance heating element extending from said first end of said threaded tubular structure through said second end of said threaded tubular structure, and extending beyond said second end, said electrically-powered tubular resistance heating element comprising an electrical connection for receiving voltage, said electrically-powered tubular resistance heating element further comprising a length and a bend in said length, said bend occurring in a portion of said length that extends beyond said second end of said threaded tubular structure, said threaded tubular structure further comprising a drain valve that drains and flushes sediment from said water heater.

9. The solar energy conversion apparatus of claim 8, said bend in said length of said electrically-powered tubular resistance heating element averting interference by said electrically-powered tubular resistance heating element with a water heater exhaust flue of said water heater.

* * * * *